United States Patent
Gage et al.

(10) Patent No.: US 8,098,381 B2
(45) Date of Patent: Jan. 17, 2012

(54) FLY HEIGHT AND SLIDER PROTRUSION MEASUREMENT

(75) Inventors: Edward Charles Gage, Mars, PA (US); Duane Clifford Karns, Pittsburgh, PA (US); Amit Vasant Itagi, Pittsburgh, PA (US); Dorothea Buechel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1114 days.

(21) Appl. No.: 11/926,235

(22) Filed: Oct. 29, 2007

(65) Prior Publication Data

US 2009/0113464 A1    Apr. 30, 2009

(51) Int. Cl.
*G01B 11/02* (2006.01)

(52) U.S. Cl. ........................................... 356/507

(58) Field of Classification Search .............. 356/505, 356/507

See application file for complete search history.

(56) References Cited

U.S. PATENT DOCUMENTS

| | | | |
|---|---|---|---|
| 5,150,338 A * | 9/1992 | Birecki et al. | 369/13.13 |
| 5,457,534 A * | 10/1995 | Lacey et al. | 356/507 |
| 6,369,900 B1 * | 4/2002 | Sundaram et al. | 356/614 |
| 6,688,743 B1 * | 2/2004 | Durnin et al. | 356/369 |
| 7,057,719 B2 | 6/2006 | Li et al. | |
| 7,057,740 B2 | 6/2006 | Hu et al. | |
| 7,206,077 B2 * | 4/2007 | Nozu et al. | 356/507 |
| 2005/0265139 A1 * | 12/2005 | Gomez et al. | 369/44.14 |
| 2008/0123219 A1 * | 5/2008 | Gomez et al. | 360/234.5 |
| 2009/0113464 A1 * | 4/2009 | Gage et al. | 720/674 |

OTHER PUBLICATIONS

Ichimura et al. "High-density optical recording using a solid immersion lens" Applied Optics, vol. 36, No. 19, Jul. 1, 1997, pp. 4339-4348.*

M. Mansuripur, "Effects of High-Numerical-Aperture Focusing on the State of Polarization in Optical and Magneto-Optic Data Storage Systems", *Applied Optics*, vol. 30, No. 22, Aug. 1, 1991, pp. 3154-3162.

I. Ichimura et al., "High-Density Optical Recording Using a Solid Immersion Lens", *Applied Optics*, vol. 36, No. 19, Jul. 1, 1997, pp. 4339-4348.

Y. V. Martynov et al., "High Numerical Aperture Optical Recording: Active Tilt Correction or Thin Cover Layer?", *Japanese Journal of Applied Physics*, 1998, pp. 1786-1792.

T. D. Milster et al., "Roles of Propagating and Evanescent Waves in Solid Immersion Lens Systems", *Applied Optics*, vol. 38, No. 23, Aug. 10, 1999, pp. 5046-5057.

W. Yeh et al., "Evanescent Coupling in Magneto-Optical and Phase-Change Disk Systems Based on the Solid Immersion Lens", *Applied Optics*, vol. 39, No. 2, Jan. 10, 2000, pp. 302-315.

(Continued)

*Primary Examiner* — Patrick J Connolly

(74) *Attorney, Agent, or Firm* — Robert P. Lenart, Esq.; Pietragallo Gordon Alfano Bosick & Raspanti, LLP

(57) ABSTRACT

An apparatus for measuring a distance such as, for example, a fly height distance. An apparatus includes a slider having an air bearing surface and an optical condenser assembly spaced apart from the air bearing surface of the slider. The optical condenser assembly includes an optical cap and an optical substrate having a first surface and a second surface. The first surface is spaced apart from the optical cap and the second surface is spaced apart from the air bearing surface of the slider.

22 Claims, 3 Drawing Sheets

OTHER PUBLICATIONS

F. Zijp et al., "Static Tester for Characterization of Optical Near-Field Coupling Phenomena", *Optical Storage and Optical Information Processing, SPIE*, vol. 4081 (2000), pp. 21-27.

T. Ishimoto et al., "Gap Servo System for a Biaxial Device Using an Optical Gap Signal in a Near Field Readout System", *IEEE*, 2002, pp. 287-289.

F. Zijp et al., "Near Field Read-Out of a 50 GB First-Surface Disk With NA=1.9 and a Proposal for a Cover-Layer Incident, Dual-Layer Near Field System", *ODS*, 2004.

J. Lee, et. al., "Development of an Air Gap Servo System for High Data Transfer Rate Near Field Optical Recording", *Japanese Journal of Applied Physics*, vol. 44, No. 5B, 2005, pp. 3423-3426.

* cited by examiner

US 8,098,381 B2

FLY HEIGHT AND SLIDER PROTRUSION MEASUREMENT

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

BACKGROUND

It is often desirable to accurately measure the distance between two objects. It is also often desirable to be able to map the surface of an object, i.e. to measure surface deformations or protrusions on the surface of an object. These tasks become increasingly difficult when working with nanoscale objects. For example, a distance that is difficult to measure is the "fly height" between a slider, or protrusions on the slider, and a disc positioned adjacent thereto. In addition, it is difficult to measure the protrusions on the surface of the slider.

Slider/disc arrangements are commonly used, for example, in data storage systems. Increased storage density is becoming increasingly important and a reduced fly height allows information to be stored in a smaller area, i.e., at a higher areal density. As fly height dimensions continue to decrease to support increased storage densities, it is important to be able to accurately measure the fly height and any protrusions on the surface of the slider in order to ensure that the data storage system is operating as designed.

SUMMARY

An aspect of the present invention is to provide an apparatus including a slider having an air bearing surface and an optical condenser assembly spaced apart from the air bearing surface of the slider. The optical condenser assembly includes an optical cap and an optical substrate having a first surface and a second surface. The first surface is spaced apart from the optical cap and the second surface is spaced apart from the air bearing surface of the slider.

Another aspect of the present invention is to provide a fly height measurement system that includes a light source for generating a light beam, a slider having an air bearing surface, and an optical condenser assembly for directing the light beam towards the slider. The optical condenser assembly includes an optical cap and an optical substrate having a first surface and a second surface. The first surface is spaced apart from the optical cap and the second surface is spaced apart from the air bearing surface of the slider by a fly height. The optical condenser assembly also includes a detector module for receiving the light beam reflected from the second surface of the optical substrate and a processor to determine the fly height based on the detector module output.

A further aspect of the present invention is to provide an apparatus including a slider having an air bearing surface, an optical disc having a surface and an opposite surface wherein the surface is spaced apart from the air bearing surface of the slider at a first distance, and means for directing an electromagnetic wave to measure the first distance. The means for directing an electromagnetic wave is spaced apart from the opposite surface a second distance.

These and various other features and advantages will be apparent from a reading of the following detailed description.

DRAWINGS

DETAILED DESCRIPTION

Figure 1:
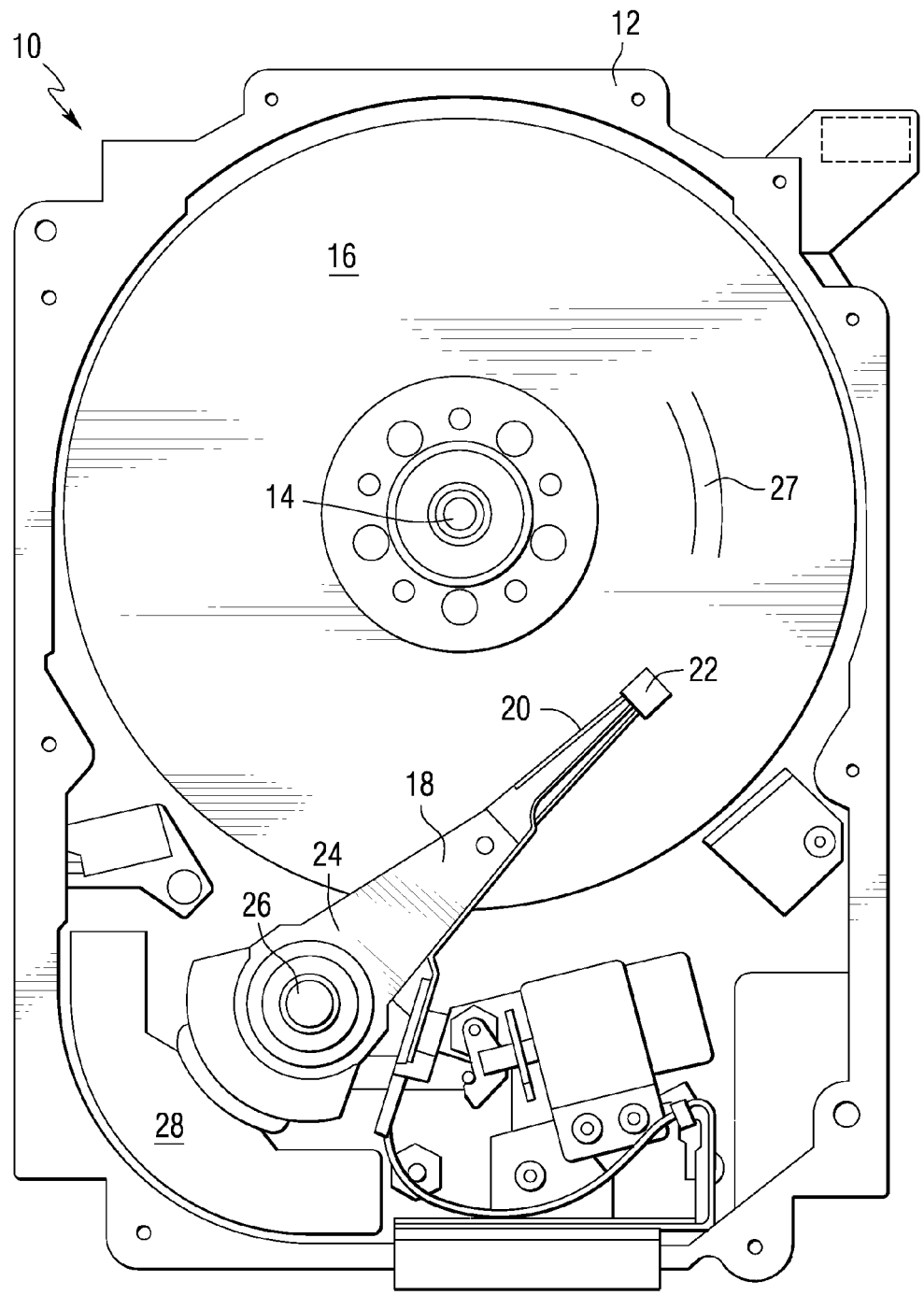
FIG. 1 is a pictorial representation of a system that can include aspects of this invention.

FIG. 1 is a pictorial representation of a system 10 that can include aspects of this invention. The system 10 includes a housing 12 (with the upper portion removed and the lower portion visible in this view) sized and configured to contain the various components of the system 10. The system 10 includes a spindle motor 14 for rotating at least one disc 16 within the housing 12. At least one arm 18 is contained within the housing 12, with each arm 18 having a first end 20 with a slider 22, and a second end 24 pivotally mounted on a shaft by a bearing 26. An actuator motor 28 is located at the arm's second end 24 for pivoting the arm 18 to position the slider 22 over a desired sector 27 of the disc 16. The actuator motor 28 is regulated by a controller, which is not shown in this view and is well known in the art.

Figure 2:
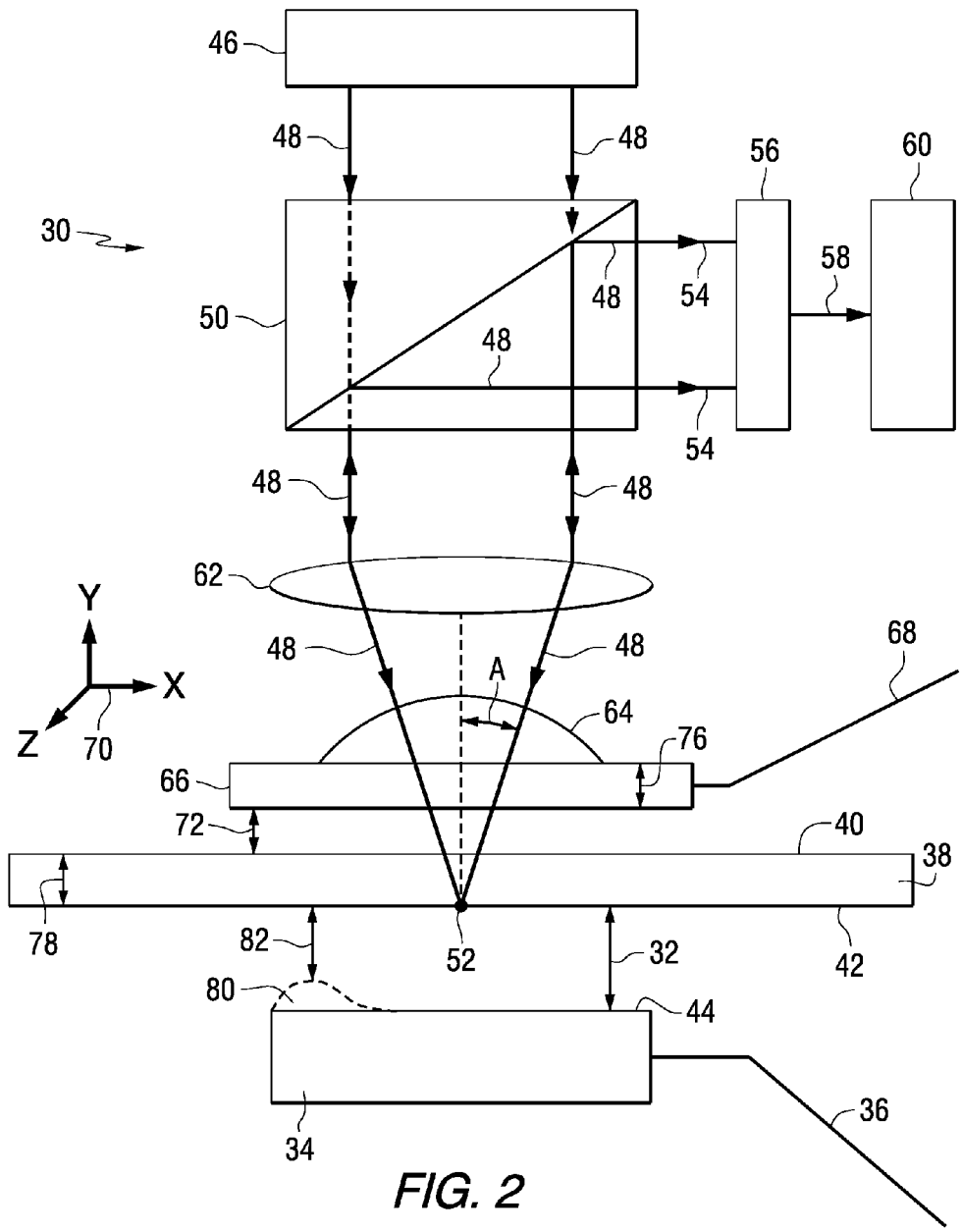
FIG. 2 is a schematic illustration of a system, in accordance with aspects of the invention.

FIG. 2 is a schematic illustration of a system 30, in accordance with aspects of the invention. The system 30 provides for measuring a distance 32 between a slider 34, supported by a suspension arm 36, and a disc 38 having a first surface 40 and an opposite second surface 42. The system 30 can measure the distance 32 between the second surface 42 of the disc 38 and an air bearing surface (ABS) 44 of the slider 34. In one aspect, the slider 34 may be a slider utilized in, for example, a data storage system and the disc 38 may represent a data storage medium. In this aspect, the distance 32 would represent the fly height at which the slider 34 would fly over the spinning disc 38. However, it will be appreciated that the invention is not limited to data storage applications and that reference herein to a data storage application is merely for illustrative purposes only.

Still referring to FIG. 2, the system 30 can include a light source 46 for generating light beams 48 and directing the light beams to a beam splitter 50. Suitable light sources 46 include, for example, a mercury arc lamp, a light emitting diode, or a diode laser capable of generating a suitable electromagnetic wave. The light beams 48, which may be linearly polarized, pass through the beam splitter 50. The light beams 48 are directed to a focal point 52 that is generally on or adjacent the second surface 42 of the disc 38. The light beams 48 are directed such that the light beams will reflect off of the second surface 42 of the disc 38 and be directed back to the beam splitter 50. At the beam splitter 50, the reflected light beams 48 are directed along a detection path 54 to a detector module 56. The reflected light beams 48 that are directed along paths 54 to the detector module 56 may have a rotated polarization. The detector module 56 then outputs the detected information along path 58 to a processor 60 for calculating the distance 32, e.g., fly height. The detector module 56 generally measures one or more properties of the reflected (transmitted) light. Suitable properties for obtaining the measurement of the distance 32 includes, for example, polarization, intensity distribution and/or phase distribution. The properties are correlated with distance properties such that using subsequent measurements, the processor 60 can receive the detector module 56 output and provide an output related to the distance 32.

At an acceptance angle smaller than about the critical acceptance angle, part of the light beams 48 will refract into the air gap between the ABS 44 and the disc 38. When an acceptance angle A (see FIG. 2) is equal to or larger than the critical acceptance angle, total internal reflection (TIR) occurs at the surface 42 and substantially all of the light beams 48 are reflected off of the surface 42 if the ABS 44 of the slider 34 is sufficiently far away from the surface 42. In addition, there will an evanescent wave generated below the surface 42 whose intensity exponentially decays away from the surface 42. When the slider 34 is brought closer to the surface 42 at a distance less than the decay length of the evanescent wave, the evanescent wave below the surface 42 will interact with the slider 34. As a result, some of the light beams 48 will be tunneled into the slider 34 (this is generally referred to as "Frustration of TIR") and the intensity of the reflected light beams 48 will be reduced. The interaction strength between the evanescent wave and the slider 34 is a function of the distance 32 between the ABS 44 and the surface 42 of the disc 38, and in turn the intensity of the reflected light beams 48 is a function of the distance 32 between the ABS 44 and the surface 42 of the disc 38. Therefore, distance 32 can be determined by the measurement of the intensity of the reflected beams 48 or the reflectance (the ratio between the intensity of the reflected beams and the intensity of the incident beams).

The detector 56 may be, for example, a photo diode that collects the reflected light beams 48 and converts the light intensity signal to a current or voltage signal. Processor 60 receives the output signal 58 from the detector 56 and normalizes the output signal 58 with the input signal, which is related to the intensity of the incident light beams 48 coming into the system 30 to obtain a processed signal. The distance 32 can be determined from this processed signal by, for example, using a standard (obtained by modeling), or calibrated fly height signal for an established measurement system. In this case, the standard or calibrated fly height signal is a known function of the fly height.

Still referring to FIG. 2, the optical assembly for directing the light beams 48 will be explained in more detail. The light beams 48 leave the beam splitter 50 and are directed to an optical component such as, for example, an objective lens 62 for focusing the light beams in a desired direction. Additional optical components such as, for example, mirrors or lenses could be used to further direct the light beams 48 as desired. The objective lens 62 directs the light beams to an optical cap 64. The optical cap 64 may be, for example, a solid immersion lens (SIL) (see FIG. 3) or a super SIL (see FIG. 4). The optical cap 64 is structured and arranged to direct the light beams 48 toward the focal point 52. The optical cap 64 directs the light beams 48 at the acceptance angle A, wherein the acceptance angle A is, for example, in the range of about 10° to about 60°.

The optical cap 64 is mounted on or attached to an optical slider element 66 that may be supported by, for example, a suspension arm 68. The optical slider element 66 is spaced apart from the surface 40 of the disc 38. The optical slider element 66 is spaced apart from the surface 40 by a distance 72 which can be considered a fly height dimension at which the optical slider element 66 flies over the surface 40. The optical slider element 66, or other type actuator element that may be utilized, is movable in at least the "X" and the "Z" directions (see coordinate system 70). Movement of the optical slider element 66 provides for the optical cap 64 to be moved relative to the disc 38 and/or the slider 34. When the optical slider element 66 moves the optical cap 64, the focal point 52 will be relocated as well. This allows for the distance 32 to be taken at various points on the ABS 44 of the slider 34 in both the "X" and "Z" directions.

Figure 3:
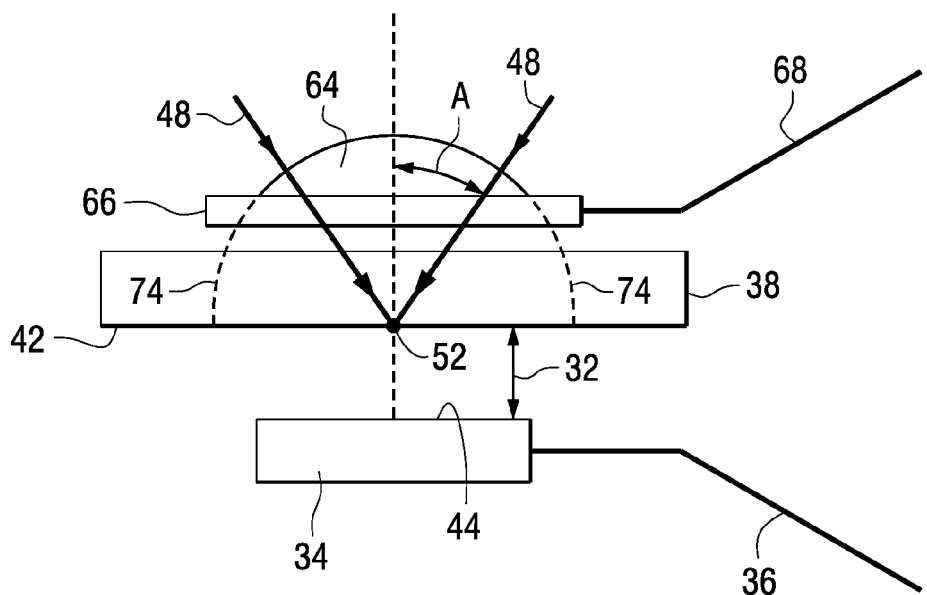
FIG. 3 illustrates the optical condenser assembly shown and described in FIG. 2, in accordance with an aspect of the invention.

FIG. 3 illustrates the optical condenser assembly shown and described in FIG. 2, in accordance with an aspect of the invention. Specifically, in order for the optical cap 64 to direct the light beams 48 to the focal point 52, the optical slider element 66 and the disc 38 need to be constructed to allow the light beams 48 to be transmitted therethrough. The optical cap 64 in FIG. 3 is a SIL which utilizes an evanescent field to couple light to a near-field surface. Therefore, the bottom surface of the SIL will need to be located in the near-field proximity to the surface of interest so that evanescent coupling can occur. For example, the SIL would need to be closer than the wavelength of incident light divided by 10, or for a wavelength of 488 nm, the SIL would need to be closer than about 49 nm. For the arrangement illustrated in FIG. 3, the thickness of the disc 38 would prohibit the near-field proximity between the SIL, i.e., the optical cap 64, and the ABS 44 of the slider 34. Therefore, in accordance with the invention, the disc 38 can be incorporated into the SIL, i.e., the optical cap 64, and act as the bottom portion thereof. This is illustrated, for example, by dashed lines 74 which extend from the ends of the optical cap 64 through the optical slider element 66 and extend to the second surface 42 of the disc 38. In this manner, the disc 38 acts as an optical substrate that is formed of a transparent material such that the resulting SIL has a generally hemispherical shape (by combining the optical cap 64 with the optical slider element 66 and the disc 38, as indicated by the extended line 74 as described herein) such that the focal point 52 on the second surface 42 can be positioned in near-field proximity to the ABS 44 of the slider 34.

The optical cap 64 may have an index of refraction in the range of about 1.5 to about 2.5. The optical slider element 66 may be formed of, for example, silicon, cubic zirconia, or GaP. The optical slider element 66 may have an index of refraction in the range of about 1.5 to about 2.5. The optical slider element 66 may have a thickness 76 in the range of about 0.25 mm to about 1.0 mm. The disc 38 may be a single or multilayer optical substrate formed of, for example, Si, $SiO_2$, YSZ, GaP, or Sapphire. The disc 38 may have an index of refraction in the range of about 1.5 to about 2.5. The disc 38 may have a thickness 78 in the range of about 0.5 mm to about 1.0 mm.

Figure 4:
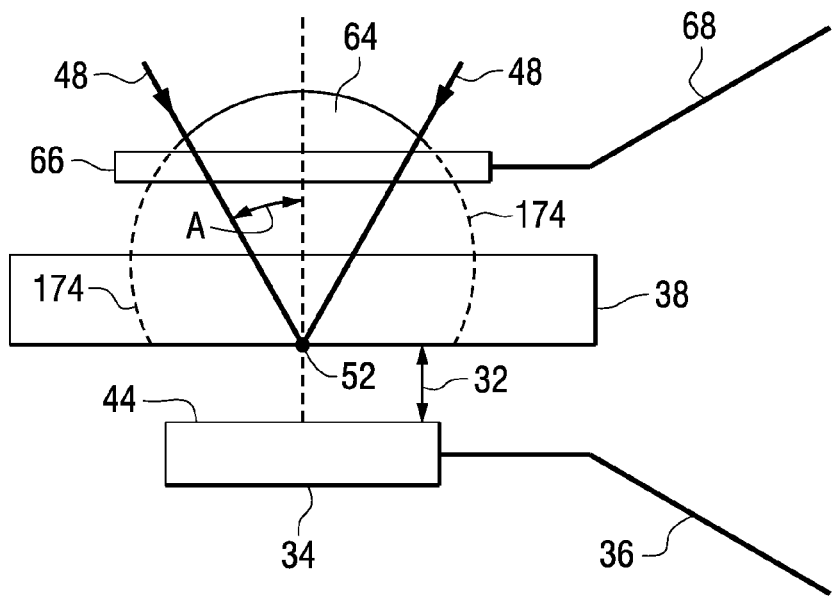
FIG. 4 illustrates a super solid immersion lens arrangement, in accordance with an aspect of the invention.

FIG. 4 illustrates a super SIL arrangement, in accordance with an aspect of the invention. Specifically, FIG. 4 illustrates that the optical cap 64 can incorporate the optical slider element 66 and the disc 38 so as to form a super SIL as indicated by dashed lines 174 so as to locate the focal point 52 in near-field proximity to the ABS 44 of the slider 34.

Referring again to FIG. 2, there is illustrated an additional aspect of the invention. The slider 34 when used, for example, in a data storage system, can experience slider deformation during operation. For example, during operation in a data storage system, write current, read current, heater current, thermal cooling and/or air flow can disturb the slider shape and the fly height distance 32. Accordingly, the slider 34 may have a deformation or protrusion 80 on the ABS 44 thereof. When attempting to measure the distance 32, i.e., the fly height between the ABS 44 of the slider 34 and the surface 42 of the disc 38, it is desirable to take into consideration any such protrusion 80 in taking the desired measurement. For example, the protrusion 80 may be spaced apart from the surface 42 by a distance 82 that is less than the distance 32 (or distance 82 could be more than distance 32). The ability to determine the distance 82 for various operating conditions will more accurately allow for the ABS 44 of the slider 34 to be mapped and analyzed. As described herein, the optical cap 64 and optical slider element 66 are movable in at least the "X" and "Z" directions such that the entire ABS 44 of the slider 34 can be measured and/or mapped as desired. Such mapping can be done using, for example, Raster scanning techniques.

The implementation described above and other implementations are within the scope of the following claims.

What is claimed is:

1. An apparatus, comprising:
   a slider having an air bearing surface; and
   an optical condenser assembly comprising:
      an optical substrate; and
      an optical cap positioned to focus light to a point adjacent to a first surface of the optical substrate;
   wherein the optical cap and the slider are positioned on opposite sides of the optical substrate.

2. The apparatus of claim 1, wherein said optical cap is mounted to an actuator element for movement of the optical cap with respect to said optical substrate.

3. The apparatus of claim 1, wherein said optical cap is mounted to an optical slider element for movement of the optical cap with respect to said optical substrate.

4. The apparatus of claim 3, wherein said optical slider element is spaced apart from said first surface of said optical substrate.

5. The apparatus of claim 3, wherein said optical slider element has an index of refraction in the range of about 1.5 to about 2.5.

6. The apparatus of claim 1, wherein said optical cap is a solid immersion lens or a super solid immersion lens.

7. The apparatus of claim 1, wherein said optical cap has an index of refraction in the range of about 1.5 to about 2.5.

8. The apparatus of claim 1, wherein said optical substrate is formed of Si, $SiO_2$, YSZ, GaP, or sapphire.

9. The apparatus of claim 1, wherein said optical substrate has an index of refraction in the range of about 1.5 to about 2.5.

10. The apparatus of claim 1, wherein said optical substrate has a thickness in the range of about 0.5 to about 1.0 mm.

11. The apparatus of claim 1, wherein said optical substrate is a spinning disc.

12. The apparatus of claim 11, wherein said first surface of said optical substrate is spaced apart from the air bearing surface of said slider by a fly height.

13. A fly height measurement system, comprising:
   a light source for generating a light beam;
   a slider having an air bearing surface;
   an optical condenser assembly for directing the light beam towards said slider, said optical condenser assembly comprising:
      an optical cap;
      an optical substrate having a first surface and a second surface, wherein said first surface is spaced apart from said optical cap and said second surface is spaced apart from the air bearing surface of said slider by a fly height;
   a detector module for receiving the light beam reflected from the second surface of said optical substrate; and
   a processor to determine the fly height based an output of the detector module.

14. The system of claim 13, wherein said optical condenser assembly directs the light beam towards said slider at an acceptance angle in the range of about 10 degrees to about 60 degrees.

15. The system of claim 13, wherein said optical condenser assembly directs the light beam to a focal point adjacent the second surface of the optical substrate.

16. The system of claim 15, wherein the second surface of said optical substrate is in near-field proximity to the air bearing surface of said slider.

17. The system of claim 13, wherein said optical substrate is a spinning disc.

18. The system of claim 13, wherein the air bearing surface of said slider includes a protrusion extending generally outward therefrom, said protrusion spaced apart from said second surface of said optical substrate by an alternate fly height.

19. The system of claim 13, wherein said optical cap is mounted to an optical slider element for movement of the optical cap with respect to said optical substrate.

20. An apparatus, comprising:
   a slider having an air bearing surface;
   an optical disc having a first surface and an opposite second surface, the first surface spaced apart from the air bearing surface of said slider by a first distance;
   means for focusing an electromagnetic wave to a point adjacent to the first surface;
   a detector for detecting a portion of the electromagnetic wave reflected from the first surface; and
   a processor for using an output from the detector to measure the first distance.

21. The apparatus of claim 20, wherein the optical disc is a spinning disc.

22. The apparatus of claim 20, wherein said means for focusing an electromagnetic wave directs the electromagnetic wave towards said slider at an acceptance angle in the range of about 10 degrees to about 60 degrees.

* * * * *